United States Patent
Rodgers et al.

(10) Patent No.: US 6,408,972 B1
(45) Date of Patent: Jun. 25, 2002

(54) ELECTRONIC TRACTION CONTROL SYSTEM

(75) Inventors: Randy J. Rodgers, Ames, IA (US); Nianzhu Luo, Easley, SC (US)

(73) Assignee: Sauer-Danfoss Inc., Ames, IA (US)

( * ) Notice: Subject to any disclaimer, the term of this patent is extended or adjusted under 35 U.S.C. 154(b) by 0 days.

(21) Appl. No.: 09/715,659

(22) Filed: Nov. 17, 2000

(51) Int. Cl.[7] .................................................. B60K 7/00
(52) U.S. Cl. ........................ 180/197; 180/242; 180/305; 180/308
(58) Field of Search ............................... 180/197, 305, 180/242, 243, 307, 308; 701/41

(56) References Cited

U.S. PATENT DOCUMENTS

| | | | | |
|---|---|---|---|---|
| 3,910,043 A | * | 10/1975 | Clerk | 60/413 |
| 4,121,601 A | * | 10/1978 | Presley | 137/101 |
| 4,236,595 A | * | 12/1980 | Beck et al. | 180/243 |
| 4,399,886 A | * | 8/1983 | Pollman | 180/197 |
| 4,401,182 A | * | 8/1983 | Pollman | 180/242 |
| 4,914,592 A | * | 4/1990 | Callahan et al. | 364/424.05 |
| 4,995,470 A | * | 2/1991 | Yamaguchi et al. | 180/197 |
| 5,199,525 A | * | 4/1993 | Schueler | 180/242 |
| 5,368,120 A | | 11/1994 | Sakai et al. | |
| 5,775,453 A | | 7/1998 | Williams et al. | |
| 5,915,492 A | | 6/1999 | Yates et al. | |
| 5,924,509 A | | 7/1999 | Ferguson et al. | |
| 6,062,332 A | | 5/2000 | Stephenson et al. | |
| 6,206,131 B1 | * | 3/2001 | Lauck | 180/305 |

* cited by examiner

Primary Examiner—Brian L. Johnson
Assistant Examiner—Daniel Yeagley (57) ABSTRACT

An electronic traction control system for a vehicle having multiple hydraulically driven wheels includes a pump, a plurality of hydraulic drive motors each fluidly connected to the pump for driving one of the wheels, a corresponding plurality of speed sensors for generating a motor speed signal for each of the motors, and an electronic flow control valve. The electronic flow control valve includes a microcontroller electrically connected to the speed sensors for receiving and comparing the motor speed signals and a plurality of normally open anti-slip valves each electrically connected to the microcontroller for receiving a flow command signal therefrom based upon comparison of the motor speed signals. Each anti-slip valve fluidly connects to a drive motor between the drive motor and the pump. This electronic traction control system provides a method of controlling motor speed without changing the displacement of the motor.

2 Claims, 7 Drawing Sheets

ELECTRONIC TRACTION CONTROL SYSTEM

BACKGROUND OF THE INVENTION

The present invention relates to the field of vehicles with multiple wheels, each of which are driven individually by a respective hydraulic motor. More particularly, this invention is a low cost electronic traction control system for such vehicles.

Various two-wheel, three-wheel, and four-wheel hydraulic drive arrangements are known for on-road and off-road mobile vehicles or machines. Two problems commonly associated with multiple wheel hydraulic drive arrangements are: 1) wheel slipping (overspeeding), and 2) wheel dragging (underspeeding). Wheel slipping or overspeeding results when the hydraulic motor drives its wheel at too high of a speed relative to the other wheels or the existing traction conditions. The wheel then tends to spin, making it ineffective for traction and steering purposes. Furthermore, the spinning wheel can consume all of the available workflow from the hydraulic pump, thereby starving the other motors and causing the vehicle to stop. Wheel dragging or underspeeding occurs when the wheel is stopped or slowed in an abrupt manner. Abrupt deceleration of the wheel can lead to turf damage, jerkiness, loss of steering control and undesirable tire wear.

One traditional approach to these problems is to provide the circuit with hydraulic combiner/divider (C/D) valves. The C/D valve has a relatively low cost, but its inclusion in the circuit limits performance. The C/D valve works on the basis of a pressure differential across the supply and work ports. When a machine most needs positive traction, the flow from the drive pump is usually quite low. Therefore, the pressure drop across the C/D valve is usually not sufficient to properly engage the working spools of the valve. Without further operator intervention, a slipping wheel would consume all of the available workflow and the machine would stop. The operator normally must command more flow from the pump, which equates to greater traveling speed, in order to reach a threshold of flow that generates the necessary pressure drop to allow the C/D valve to perform its intended function of forcefully dividing flow to the various working motors. When working near a construction site, around people, ordinary equipment, an operator command to increase the work flow from the drive pump in order to engage the traction control function is not only undesired, but may also may be unsafe. Conventional C/D valves also introduce considerable heat into a hydraulic circuit by virtue of the differential pressure drop. The pressure drop is proportional to the system flow and is therefore greatest when the machine is in a high speed travelling mode rather than during turning or low-speed off-road operation. Traction control is typically not required when the machine is travelling at higher speeds. Thus, heat is constantly being added to the system by the C/D valve, independently of the actual vehicle need for traction control. Heat is a natural enemy of a hydraulic transmission. Thus, there is a need for a non-complex, low cost electronic traction control system that offers improved performance.

Therefore, a primary objective of the present invention is the provision of an improved electronic traction control system for a four-wheel drive vehicle.

Another objective of this invention is the provision of an electronic control system that is durable, economical to produce, and reliable in use.

These and other objectives will be apparent from the drawings, as well as from the description and claims that follow.

SUMMARY OF THE INVENTION

The present invention relates to an electronic traction control system for vehicle having multiple hydraulically driven wheels. The system includes a pump, a plurality of hydraulic drive motors each fluidly connected to the pump for driving one of the wheels, a corresponding plurality of speed sensors for generating a motor speed signal for each of the motors, and an electronic flow control valve. The electronic flow control valve includes a microcontroller electrically connected to the speed sensors for receiving and comparing the motor speed signals and a plurality of normally open anti-slip valves each electrically connected to the microcontroller for receiving a flow command signal therefrom based upon comparison of the motor speed signals. Each anti-slip valve fluidly connects to a drive motor between the drive motor and the pump.

As further described herein, the electronic traction control system of this invention provides a method of controlling motor speed without changing the displacement of the motor.

DETAILED DESCRIPTION OF THE PREFERRED EMBODIMENT(S)

Figure 1:
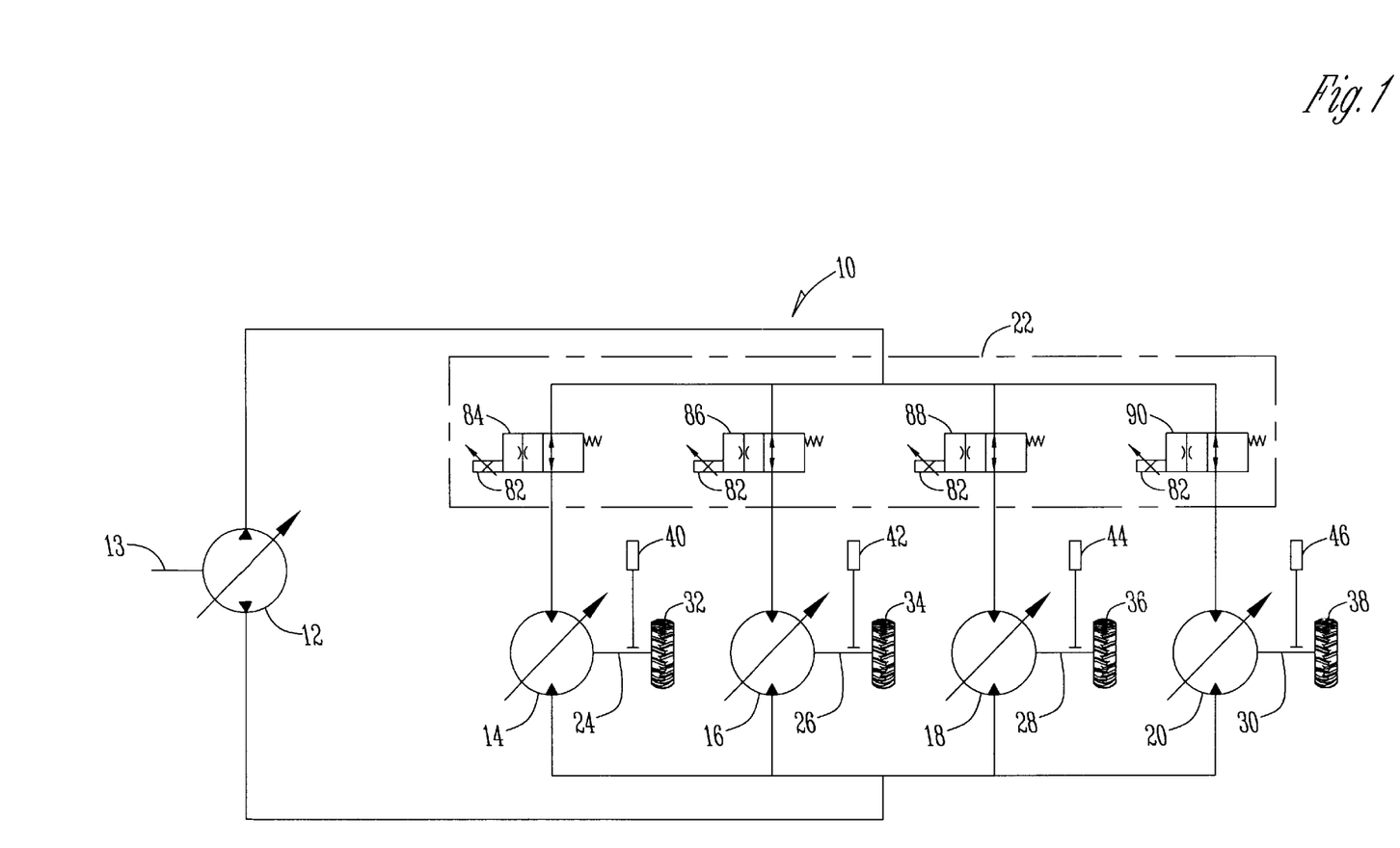
FIG. 1 is a hydraulic schematic diagram depicting the anti-slip valve manifold assembly of this invention and its placement in a hydrostatic transmission circuit for a four-wheel drive vehicle.

FIG. 1 shows a hydrostatic transmission circuit utilizing the present invention. The circuit 10 includes a variable displacement hydraulic pump 12 having an input shaft 13 driven in a conventional manner by an engine or prime mover (not shown). A plurality of hydraulic drive motors 14, 16, 18, 20 fluidly connect in parallel closed circuit loops to the pump 12 through an anti-slip valve manifold assembly 22. Each of the motors 14, 16, 18, 20 has an output shaft 24, 26, 28, 30 drivingly connected to a respective drive wheel 32, 34, 36, 38 on the vehicle. Some or all of the drive wheels 32, 34, 36, 38 can be steerable. Individual speed sensors 40, 42, 44, 46 are associated with each of the motors 14, 16, 18, and 20 respectively.

Figure 4:
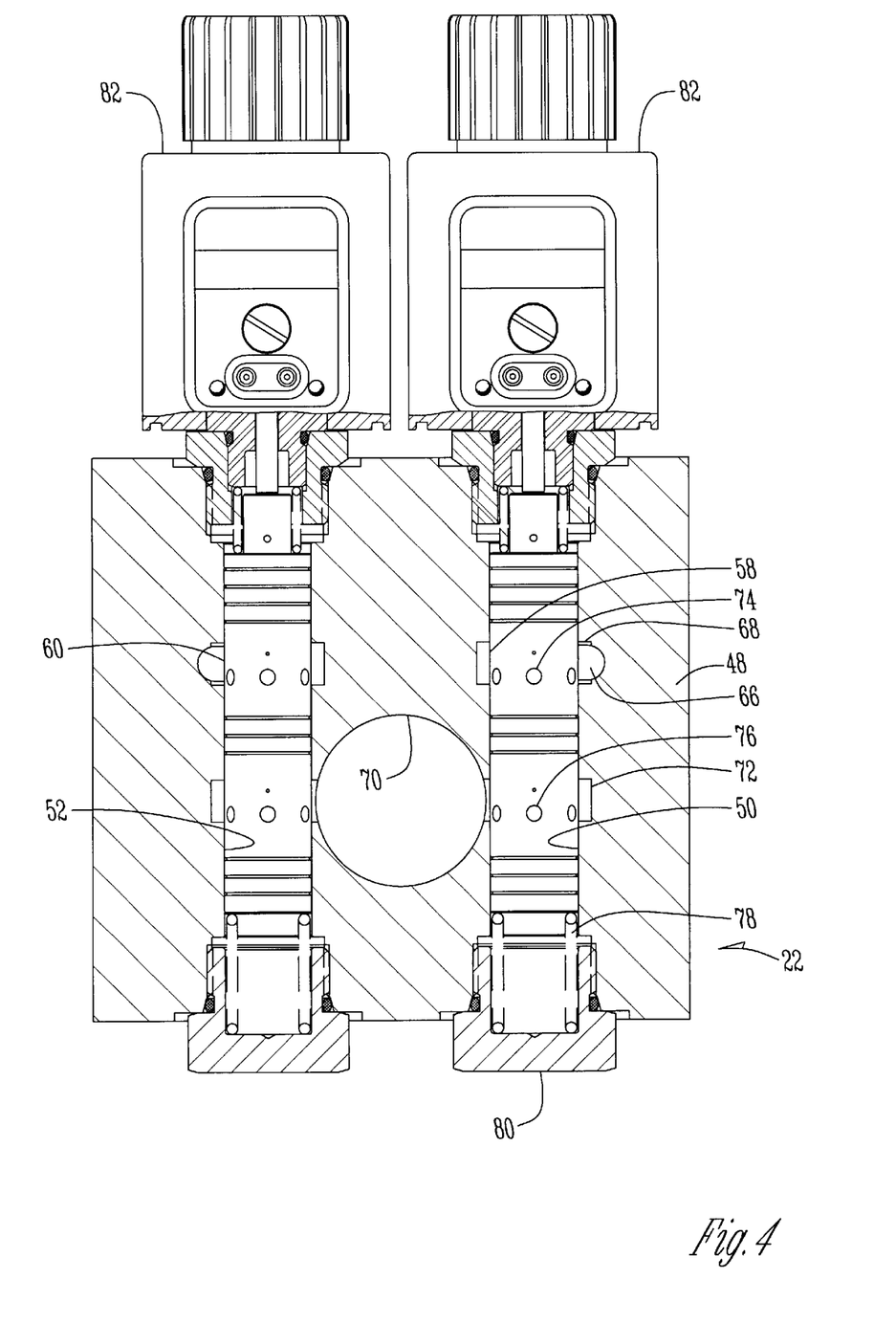
FIG. 4 is a cross-sectional view of the anti-slip manifold assembly taken along line 4—4 in FIG. 3 so as to show the construction of the anti-slip spool valves. For clarity, the valve spools themselves are not shown in cross-section.
Figure 5:
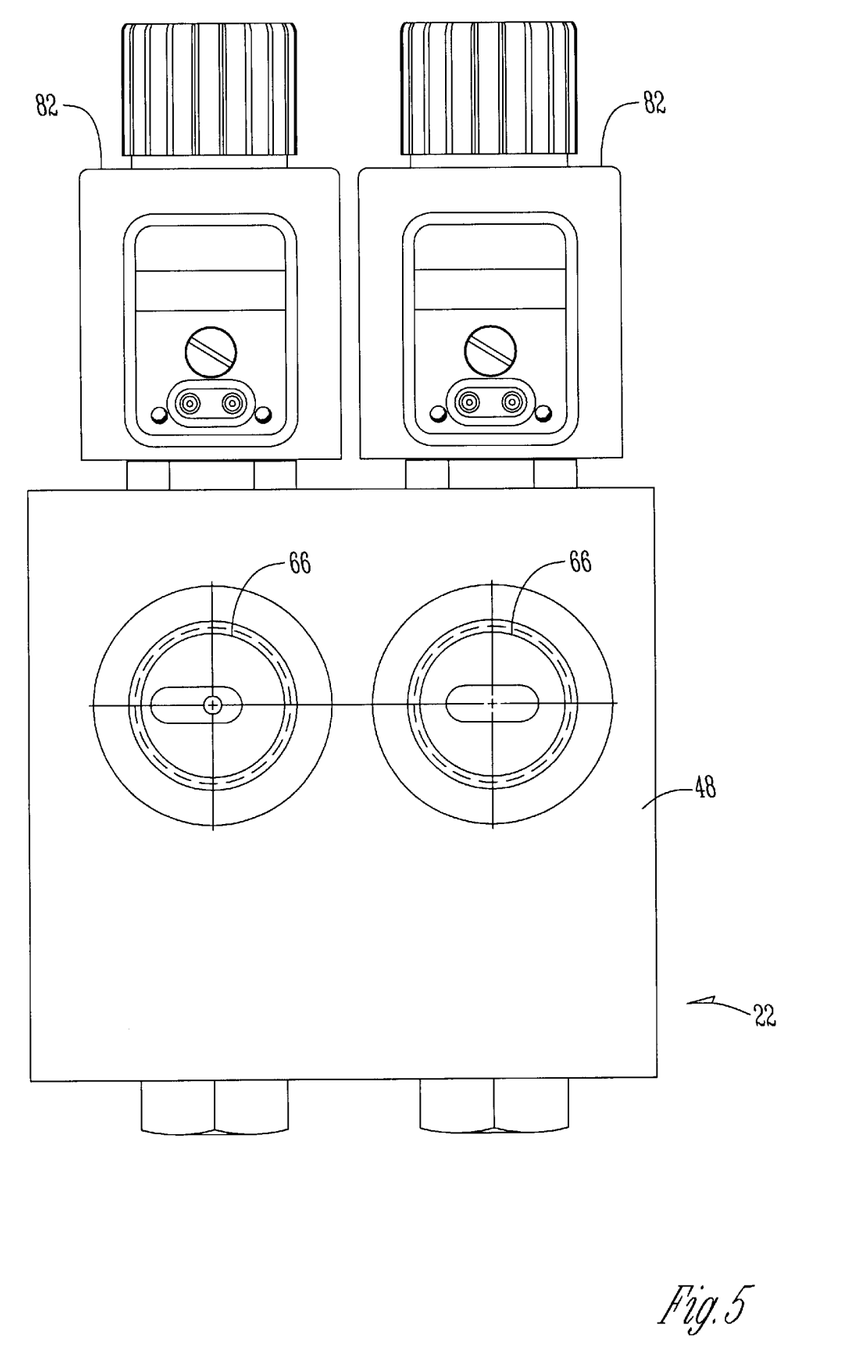
FIG. 5 is a rear elevation view of the anti-slip manifold assembly of FIG. 3.
Figure 6:
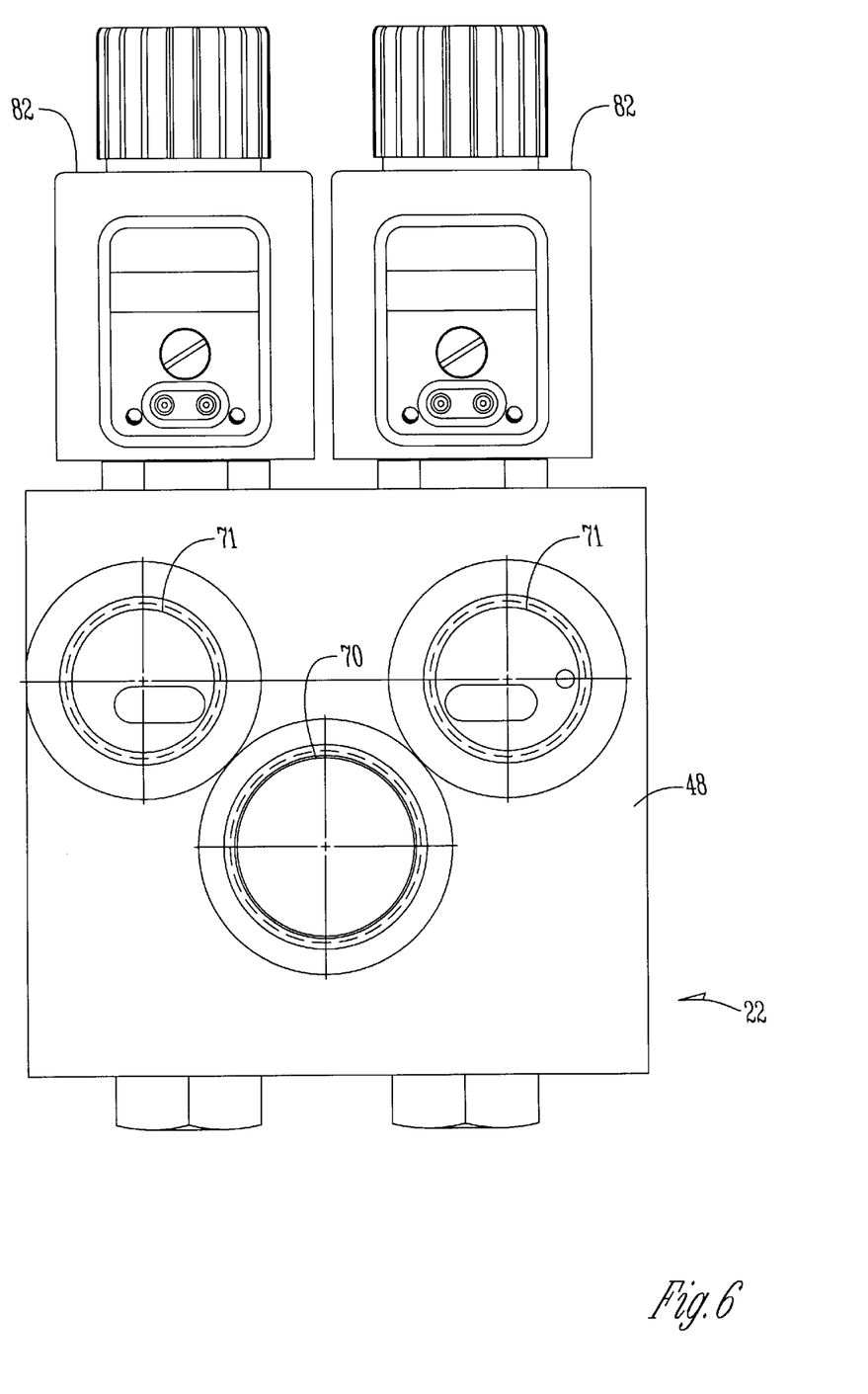
FIG. 6 is a front elevation view of the anti-slip manifold assembly of FIG. 3.

As best seen in FIGS. 1 and 3–6, the anti-slip manifold assembly 22 preferably includes a single manifold housing 48 having a plurality of spool bores 50, 52, 54, 56 therein corresponding to the number of motors for which anti-slip electronic traction control is desired. Movable valve spools 58, 60, 62, 64 reside in each of the spool bores 50, 52, 54, 56 respectively. The valve spool and bore configurations are substantially identical to each other except for their orientation in the housing 48. Therefore, FIG. 4 shows only one pair of bores 50, 52 and valve spools 58, 60, and only the valve spool and bore configuration on the right in FIG. 4 is described in detail below.

A first port 66 (FIG. 5) fluidly connects with the spool bore 50 through a first annular groove 68, and a second port 70 fluidly connects with the bore 50 through a second annular groove 72 that is spaced apart along the longitudinal axis of the bore 50 from the first groove 68. The second port 70 is preferably fluidly connected to the pump 12. A third port 71 is also in fluid communication with the groove 68 so as to act as a gauge port. See FIG. 6.

Referring again to FIG. 4, the valve spool 58 is an elongated hollow member that has a first set of one or more fluid metering holes 74 extending into its hollow interior. The metering holes 74 are located in such a way that they are always in fluid communication with the groove 68 and the port 66 throughout the full range of possible spool movement. The valve spool 58 also includes a second set of metering holes 76 that extend into the hollow interior of the spool 58. The metering holes 76 are always at least partially in fluid communication with the groove 72 and the port 70.

A spring 78 mounted in a plug 80 connects with one end of the valve spool 58 and normally urges the spool into an open position wherein fluid flow is permitted the fullest possible extent through the metering holes 76. A proportional solenoid 82 connects to the other end of the spool 58. When the signal (electrical current) to the proportional solenoid is sufficient to overcome the biasing force of the spring 78, the solenoid urges the spool 58 proportionally lower in FIG. 4. The holes 76 begin to overlap the lower edge of the groove 72 and start to meter or restrict the free flow of fluid through the spool. As the command signal or current increases, the spool movement increases proportionally and flow is restricted to and from the associated motor. However, the valve is designed so as to stay at least partially open throughout the full range of permissible spool movement. This valve structure constitutes a two-port, two-position, bi-directional, normally open, proportional flow control valve, which is designated by reference numerals 84, 86, 88, 90 in the circuit diagram of FIG. 1. The number, size and distribution of the holes 74, 76 are preferably chosen so as to provide a virtually unrestricted flow passage that is capable of handling the full flow to the motor 14, 16, 18, or 20 with a very low pressure drop (for example, about 100 psi at 10 gallons per minute) across the valve 84, 86, 88, 90. Thus, minimal heat is introduced into the circuit as a result of the flow control valves.

Figure 2:
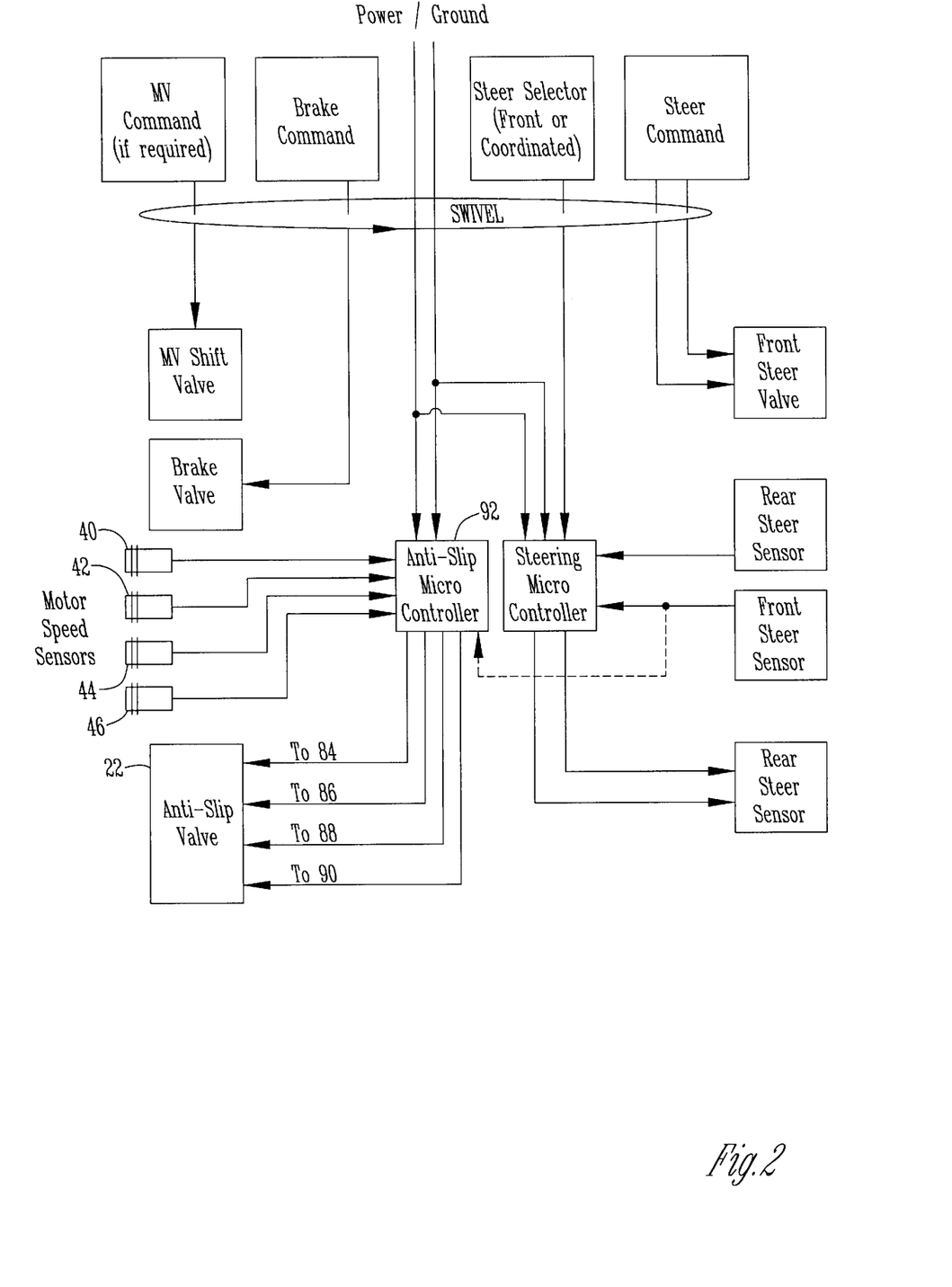
FIG. 2 is a schematic diagram depicting the electronic traction control system of this invention.
Figure 3:
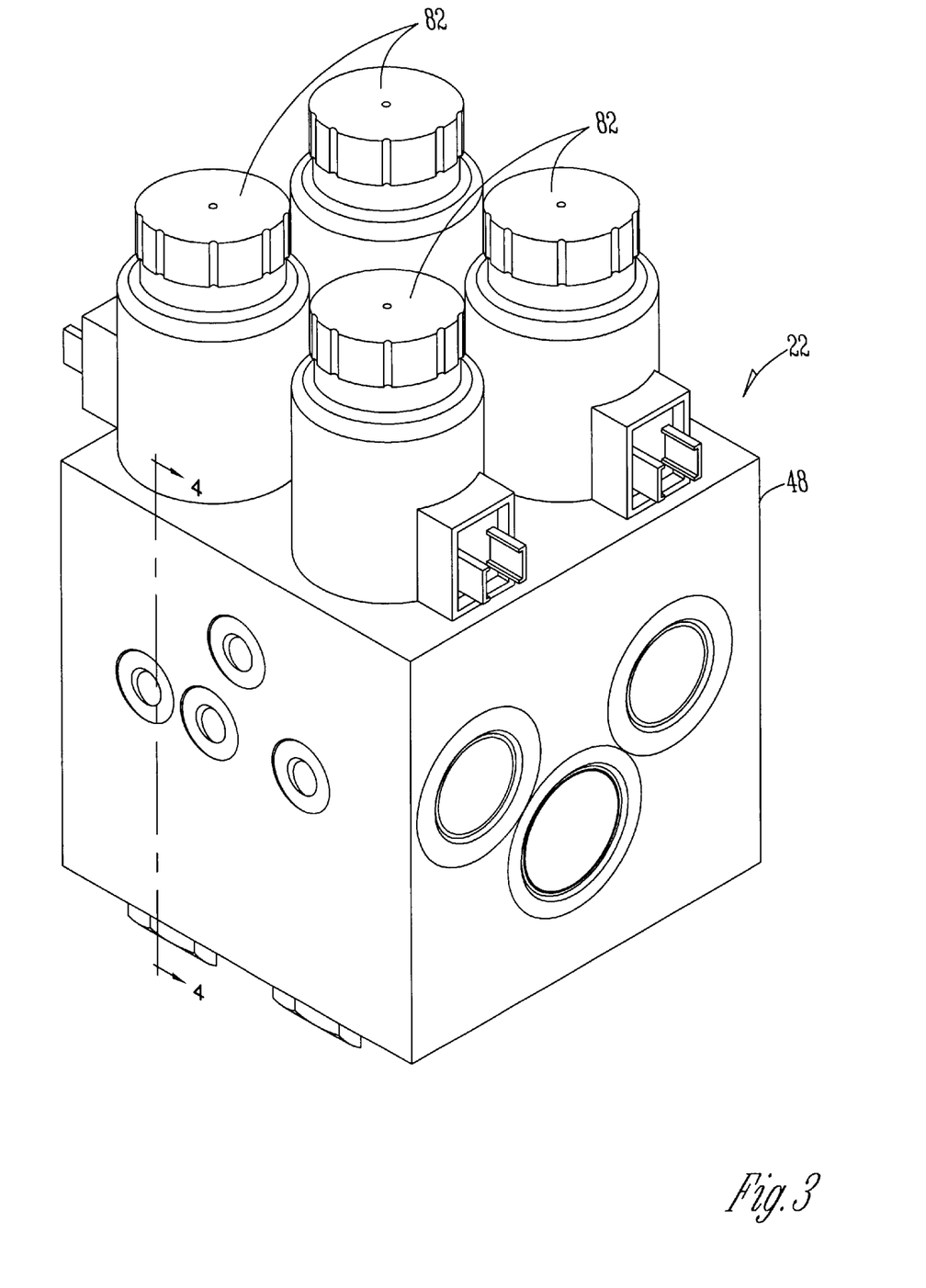
FIG. 3 is a perspective view of the anti-slip valve manifold assembly of FIG. 1.

As best seen in FIG. 2, the motor speed sensors 40, 42, 44, 46 each electrically connect to a programmable anti-slip microcontroller 92 so as to provide input signals indicative of the speed of each individual motor 14, 16, 18, 20. The microcontroller 92 electrically connects to each of the flow control valves 84, 86, 88, 90 in the anti-slip valve manifold assembly 22 so as to provide individual command signals for their solenoids 82.

In operation, the microcontroller 92 compares all available motor speed signals from the sensors 40, 42, 44, 46 and identifies any motors that are exceeding the speed of the other motors by a predetermined amount according to its program. The preprogrammed amount can be a given differential in revolutions per minute (rpm) or the amount could be stated in relative terms such as ten percent or twenty percent, for example. The microcontroller 92 commands solenoid 82 of the flow control valve 84, 86, 88 or 90 corresponding to the offending motor 14, 16, 18, or 20 to restrict proportionally the fluid flow to said motor until its speed once again matches that of the other motors. The motor speed sensor on the offending motor provides feedback to the microcontroller 92, which commands the flow control valve to modulate the flow passage to or from the motor such that all wheels are matched in speed. A wheel that is completely unloaded will not stop abruptly or completely so as to underspeed or drag. Instead, the unloaded wheel will continue to rotate with all the other wheels. The sensors continue to send motor speed signals to the microcontroller so that closed loop feedback is provided. Once the unloaded wheel has regained its normal traction condition or matched speed with the other wheels, the associated flow control valve will automatically reset to the fully open position.

Figure 7:
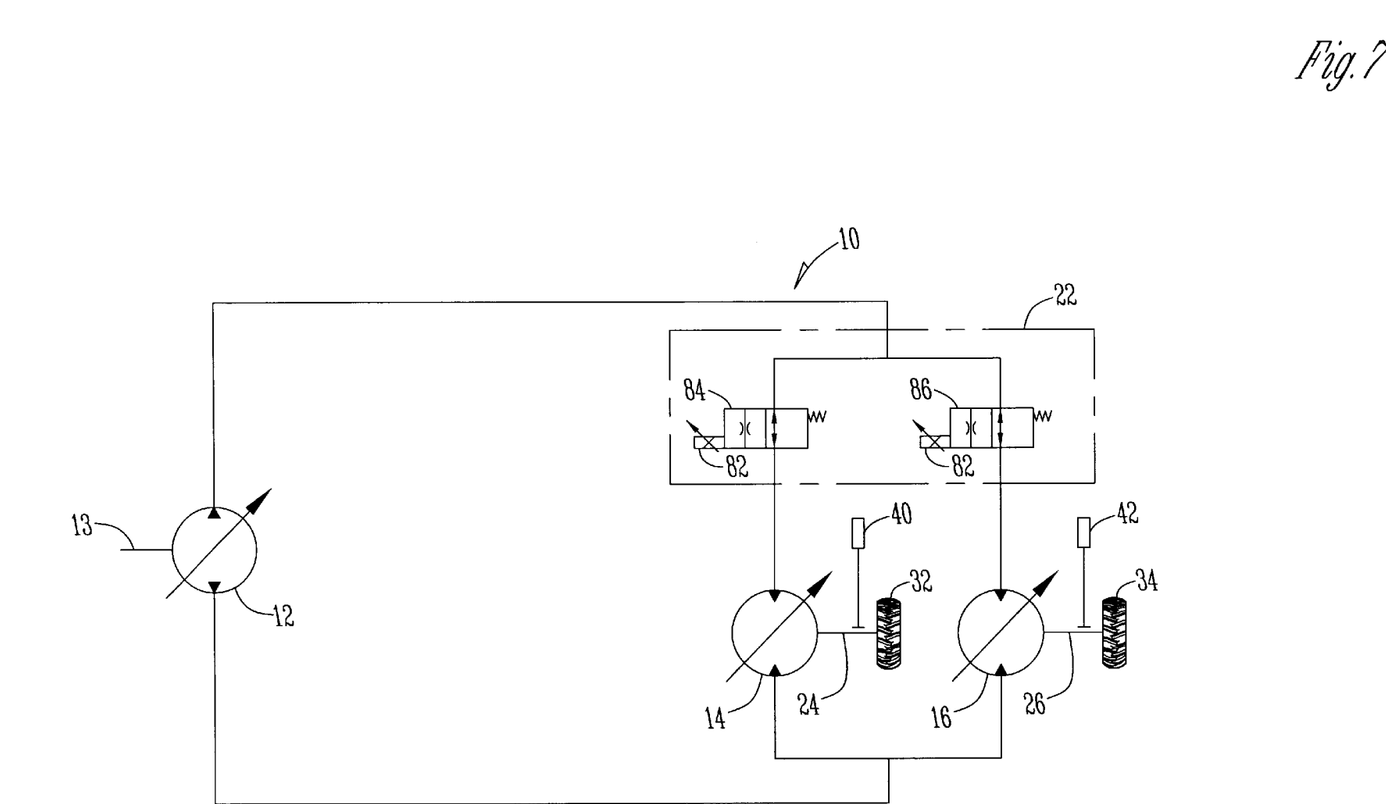
FIG. 7 is a schematic diagram similar to FIG. 1 but shows the present invention applied to a vehicle having two driven wheels.

Although the above description has focused on a four-wheel drive vehicle, the present invention is readily adaptable to two-wheel or three-wheel hydraulically driven vehicles as well. See FIG. 7, which illustrates application of this invention in a two-wheel drive vehicle. The bi-directional nature of the anti-slip valve allows it to be effective whether placed on either side of the motor in the closed loop circuit, and regardless of the direction of fluid flow within the circuit. Thus, the present invention achieves consistent electronic traction control in both the forward and reverse directions of vehicle movement. The anti-slip or flow control valves 84, 86, 88, 90 and the manifold assembly 22 are relatively inexpensive to produce and have greatly simplified installation and plumbing requirements when compared to conventional C/D valves. Another major benefit of the electronic traction control system is performance enhancement. The electronic speed feedback of this invention works well at all vehicle speeds and is independent of motor types and displacements. Thus, fixed displacement motors could be substituted for or used in combination with the variable displacement motors 14, 16, 18, 20 shown in FIG. 1, without detracting from the invention. The software parameters of the microcontroller 92 can be changed quickly and easily to accommodate various machines and configurations that are often available. Common components for the traction control system can be used for different wheel base sizes, different motors, different tire sizes, etc.

Therefore, it can be seen that the present invention at least satisfies its stated objectives.

What is claimed is:

1. An electronic traction control for a vehicle having multiple hydraulically driven wheels comprising:

a hydraulic pump;

a plurality of hydraulic drive motors each fluidly connected to the pump for driving one of the wheels;

a plurality of speed sensors corresponding in number to the plurality of drive motors for generating a motor speed signal for each of the drive motors;

an electronic flow control valve comprising a microcontroller electrically connected to the speed sensors for receiving and comparing the motor speed signals and a plurality of normally open proportional solenoid-operated spool valves each electrically connected to the microcontroller for receiving a flow restricting command signal therefrom based upon comparison of the motor speed signals, the anti-slip valve being fluidly connected to one of the drive motors and operatively located between said drive motor and the pump;

the spool valves including a housing having a spool bore and first and second ports therein, the spool valve including an elongated hollow valve spool slidably mounted in the spool bore and having a predetermined range of travel therewithin, the valve spool including a first plurality of metering holes extending therethrough and in fluid communication with the first port and a second plurality of metering holes extending therethrough and in fluid communication with the second port, the first and second plurality of metering holes being spaced apart and at least partially registered with the first and second ports respectively such that some fluid flow is permitted from the second port to the first port through the metering holes throughout the entire range of travel of the valve spool.

2. The control of claim 1 wherein the valve spool is slidably mounted for linear movement longitudinally within the spool bore.

* * * * *